(12) United States Patent
Muraoka et al.

(10) Patent No.: US 10,391,589 B2
(45) Date of Patent: *Aug. 27, 2019

(54) FLUX APPLYING DEVICE

(71) Applicant: Senju Metal Industry Co., Ltd., Tokyo (JP)

(72) Inventors: Manabu Muraoka, Tochigi (JP); Takeo Saitoh, Tochigi (JP); Shigeyuki Sekine, Tochigi (JP); Takashi Obayashi, Tochigi (JP); Kaichi Tsuruta, Tochigi (JP); Takashi Hagiwara, Tochigi (JP); Hiroyuki Yamasaki, Tochigi (JP); Kota Kikuchi, Tokyo (JP); Naoto Kameda, Tochigi (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 6 days.

This patent is subject to a terminal disclaimer.

(21) Appl. No.: 15/563,017

(22) PCT Filed: Mar. 30, 2015

(86) PCT No.: PCT/JP2015/059899
§ 371 (c)(1),
(2) Date: Sep. 29, 2017

(87) PCT Pub. No.: WO2016/157357
PCT Pub. Date: Oct. 6, 2016

(65) Prior Publication Data
US 2018/0185967 A1      Jul. 5, 2018

(51) Int. Cl.
*B23K 3/00*       (2006.01)
*B23K 35/02*     (2006.01)
(Continued)

(52) U.S. Cl.
CPC .......... *B23K 35/0238* (2013.01); *B05C 3/125* (2013.01); *B05C 9/14* (2013.01);
(Continued)

(58) Field of Classification Search
CPC .... B23K 35/0227–0238; B23K 35/404; B23K 3/082; B23K 35/40; B23K 1/203
(Continued)

(56) References Cited

U.S. PATENT DOCUMENTS 2,055,393 A * 9/1936 Thomas .................. B23K 1/08
174/94 R
3,724,418 A * 4/1973 McLain ................ B23K 1/015
118/300

(Continued)

FOREIGN PATENT DOCUMENTS

CN       1398212 A       2/2003
CN     101837497 A       9/2010
(Continued)

OTHER PUBLICATIONS

Machine translation of JP-2001-001136A (no date available).*
Machine translation of JP-2012-211358A (no date available).*

*Primary Examiner* — Kiley S Stoner
(74) *Attorney, Agent, or Firm* — The Webb Law Firm (57) ABSTRACT

A flux applying device for applying flux to a surface of solder, wherein the flux applying device includes: a dipping means that applies the flux to the surface of the solder by dipping the solder into the flux; a load applying means that applies a predetermined load to the solder, the load applying means being provided at a upstream side of the dipping means; a constant speed conveying means that conveys the solder at a predetermined speed with being under load by the load applying means; a drying means that dries the solder to which the flux is applied; a cooling means that cools the dried solder; a conveying speed measurement means that (Continued)

measures a conveying speed of the solder; and a control means that controls the conveying speed of the solder.

4 Claims, 6 Drawing Sheets

(51) Int. Cl.
  *B23K 35/40* (2006.01)
  *B23K 3/08* (2006.01)
  *B05C 3/12* (2006.01)
  *B05C 9/14* (2006.01)
  *B05C 9/12* (2006.01)
(52) U.S. Cl.
  CPC .............. *B23K 3/082* (2013.01); *B23K 3/085* (2013.01); *B23K 35/0233* (2013.01); *B23K 35/40* (2013.01); *B23K 35/404* (2013.01); *B05C 9/12* (2013.01)
(58) Field of Classification Search
  USPC .......... 228/207, 223–224, 33, 41, 36, 40, 43
  See application file for complete search history.

(56) References Cited

U.S. PATENT DOCUMENTS

| | | | | |
|---|---|---|---|---|
| 4,499,120 A * | 2/1985 | Marshall, Jr. | .......... | B23K 1/085 156/278 |
| 4,619,841 A * | 10/1986 | Schwerin | .............. | B23K 1/018 118/56 |
| 4,661,215 A * | 4/1987 | Diehl | .................... | B21C 37/042 205/140 |
| 4,790,686 A * | 12/1988 | Christ | ...................... | C23C 2/265 138/122 |
| 5,139,822 A * | 8/1992 | Hepler | ................ | B23K 3/0692 427/123 |
| 5,184,767 A * | 2/1993 | Estes | .................. | B23K 35/0227 228/13 |
| 5,332,438 A | 7/1994 | Ueda et al. | | |
| 6,136,380 A * | 10/2000 | Suzuki | ................. | B23K 1/0012 427/434.2 |
| 6,428,851 B1 * | 8/2002 | Friedersdorf | ............ | B05D 1/00 427/209 |
| 10,137,538 B2 * | 11/2018 | Muraoka | .............. | B23K 35/404 |
| 2007/0272334 A1 * | 11/2007 | Campbell | .............. | B23K 35/40 148/689 |
| 2009/0064983 A1 * | 3/2009 | Sudarshan | ........... | B23D 61/185 125/21 |
| 2012/0103252 A1 | 5/2012 | Watanabe | | |
| 2015/0174678 A1 | 6/2015 | Sato et al. | | |
| 2016/0175994 A1 * | 6/2016 | Pandher | ............... | B23K 35/262 228/223 |

FOREIGN PATENT DOCUMENTS

| | | | |
|---|---|---|---|
| CN | 102939402 A | | 2/2013 |
| GB | 1461306 A | * | 1/1977 |
| JP | 4112330 B1 | | 7/1941 |
| JP | 5475452 A | | 6/1979 |
| JP | 3254392 A | | 11/1991 |
| JP | 4111994 A | | 4/1992 |
| JP | 649614 A | | 2/1994 |
| JP | 07270436 A | * | 10/1995 |
| JP | 20011136 A | | 1/2001 |
| JP | 2012211358 A | | 11/2012 |
| JP | 201513248 A | | 1/2015 |
| KR | 1020040038494 A | | 5/2004 |
| TW | 201410366 A | | 3/2014 |
| WO | 0138040 A1 | | 5/2001 |

\* cited by examiner

FLUX APPLYING DEVICE

CROSS-REFERENCE TO RELATED APPLICATION

This application is the United States national phase of International Application No. PCT/JP2015/059899 filed Mar. 30, 2015, the disclosure of which is hereby incorporated in its entirety by reference.

TECHNICAL FIELD

The present invention relates to a flux applying device which applies flux to a surface of solder and solder applied with flux by using the flux applying device.

BACKGROUND

Flux used for soldering is applied to the solder through a flux applying step when soldering. The flux chemically removes any metal oxides on a surface of the solder and a surface of the metal to be soldered, and forms intermetallic compounds between the solder and the metal to be soldered so that they can be strongly connected. Moreover, the flux has such effects that it prevents the metal surface from being again oxidized during a period of heating time in a soldering step; it reduces surface tension of the solder to improve wettability thereof.

Further, flux coating preform solder in which the flux is applied to a surface of the solder formed so as to be a long, narrow strip of solder has been proposed. Since in the flux coating preform solder, the flux has been previously coated, it is possible to omit a flux applying step in the soldering time. Since the flux coating preform solder is a long, narrow strip of solder, it can be processed so as to be a suitable form such as a pellet, a washer and a disk, thereby allowing it to be applied to a various kinds of mounting technologies.

In such flux coating preform solder, the flux needs to be coated thin and almost uniformly on a surface of solder. This is because if the flux is thick or non-uniformly applied on the surface of the solder, this becomes any cause of failure in the soldering. Patent Document 1 discloses a flux applying apparatus in which a solder line is passed through a tank containing molten flux and rollers pull the solder line through a die so that the die adjusts an amount of flux applied to the solder line on an assumption that the flux is applied to the surface of the solder line just before the soldering.

PRIOR ART DOCUMENTS

Patent Documents

Patent Document 1: Japanese Patent Application Publication No. S54-075452

SUMMARY OF THE INVENTION

Problems to be Solved by the Invention

However, conventional flux applying device has the following drawbacks.
(1) When the flux applying device is used for a long period of time, the flux adheres to a member (die) which adjusts an amount of applied flux and solidified, so that it is difficult to apply the flux to the surface of solder with the uniform thickness thereof.
(2) When changing the thickness of the flux to be applied to the solder, the member (die) itself which adjusts an amount of applied flux may have to be replaced by another.

For the flux applying device disclosed in Patent Document 1, any measures against the issues mentioned above has not been taken.

Accordingly, this invention addresses the above-mentioned issues and has an object to apply the flux to a surface of solder with uniform thickness thereof and further maintains its uniformity even when the flux applying device is used for a long period of time.

Means for Solving the Problems

The technical means of the present invention adapted so as to address the above-mentioned issues is as follows:

(1) A flux applying device for applying flux to a surface of solder, wherein the flux applying device comprises: a dipping means that applies the flux to the surface of the solder by dipping the solder into the flux; a load applying means that applies a predetermined load to the solder, the load applying means being provided at a upstream side of the dipping means, when a side into which the solder enters is set to be the upstream side and a side out of which the solder is discharged is set to be a downstream side; a constant speed conveying means that conveys the solder at a predetermined speed with being under load by the load applying means, the solder to which the flux is applied by the dipping means being pulled up vertically in relation to a liquid surface of the flux; a drying means that dries the solder to which the flux is applied; a cooling means that cools the dried solder; a conveying speed measurement means that measures a conveying speed of the solder; and a control means that controls the conveying speed of the solder.

(2) The flux applying device according to the above-mentioned item (1) wherein the constant speed conveying means includes a conveying means, the conveying means includes at least one conveying roller, the conveying roller contains two rollers that nip the solder, and the rollers nip both ends of the solder.

(3) The flux applying device according to the above-mentioned item (1) or (2) wherein at least the dipping means, the drying means, and the cooling means are housed in a flux applying chamber, and the flux applying chamber further includes a discharging means that discharges hot air outside the drying means and inside the flux applying chamber.

(4) The flux applying device according to any one of the above-mentioned items (1) through (3) wherein the constant speed conveying means includes a winding means, and further an interlayer paper sheet supplying means that supplies an interlayer paper sheet when winding the solder by the winding means.

(5) Solder formed by the flux applying device according to any one of the above-mentioned items (1) through (4).

Effects of the Invention

By the flux applying device according to the present invention, it is possible to apply flux to solder with uniform and thin thickness. When changing the thickness of the flux to be applied to the solder, any changes of the position of member or member itself are not required. Since even when this flux applying device is used for a long period of time, this effect can be obtained, thereby flux can be applied to the solder with a high reliability.

By the solder formed by the flux applying device according to the present invention, flux is applied with uniform and thin thickness. Accordingly, solder which is good in solderability and in which the flux is applied to its surface can be manufactured, namely, flux coating preform solder can be manufactured.

EMBODIMENTS FOR CARRYING OUT THE INVENTION

The following will describe configuration examples of a flux applying device according to the invention and a flux coating preform solder formed by the flux applying device, with reference to drawings.

[Configuration Example of Flux Applying Device 100]

Figure 1:
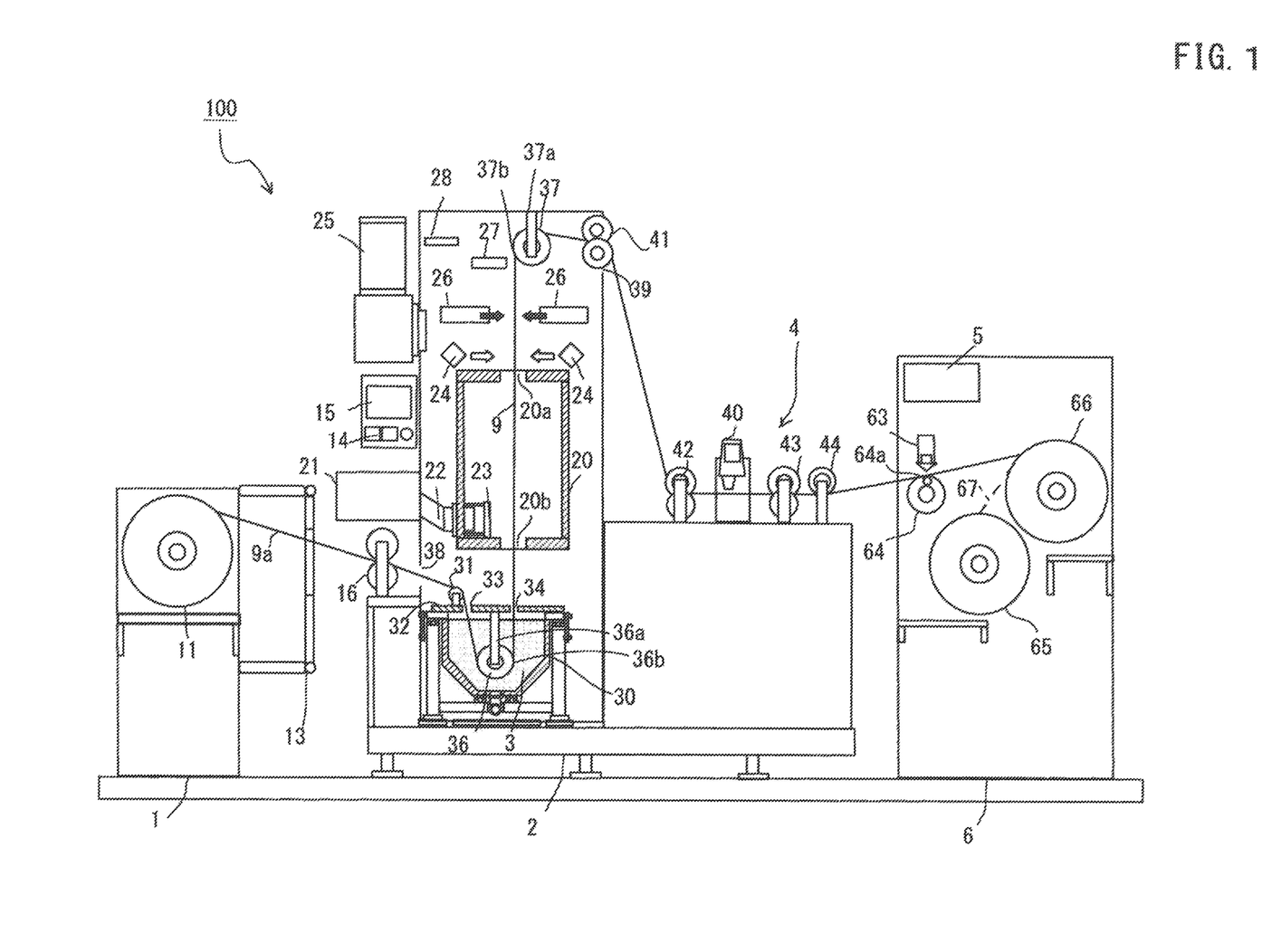
FIG. 1 is an outline plan view of a flux applying device 100 according to this invention showing a configuration example thereof.

The flux applying device 100 shown in FIG. 1 applies the flux 3 to a surface of the solder which is formed so as to be a long, narrow strip of solder and have a predetermined width, as an example, with a uniform thickness. It is assumed that a side of drawing out (supplying) the solder formed so as to be a long, narrow strip of solder and dipping it into a flux tank 30, namely a left side in the drawing is an upstream side along a conveying direction of the solder. It is also assumed that a side of discharging the solder from the flux tank 30 and winding it, namely a right side in the drawing is a downstream side. The solder is conveyed from the upstream to the downstream. In this embodiment, the solder before the flux 3 is applied thereto will be described as solder 9a, and the solder after the flux 3 is applied thereto will be described as solder 9.

The flux applying device 100 contains a solder supplying portion 1, a flux applying chamber 2 that applies the flux 3 (pear-skin patterned in FIG. 1) to the solder 9a, a conveying portion 4 that conveys the solder 9 to which the flux 3 is applied, a winding portion 6 that winds the conveyed solder 9, brake rollers 16 that are located at downstream of the solder supplying portion 1 and at upstream of the flux applying chamber 2, and a control portion 5 that controls each operation of the flux applying device 100. The flux applying device 100 may contain a film thickness gauge 40 that measures thickness of the solder 9 to which the flux 3 is applied.

The solder supplying portion 1 includes a drawing-out reel 11 on which, for example, the solder 9a is wound like a roll, and a drawing-out buffer sensor 13 that detects the state of drawn-out solder 9a.

The drawing-out reel 11 is provided with a motor (not shown), which is driven to rotate at a predetermined rotation speed.

The drawing-out buffer sensor 13 contains a pair of sensors (not shown) located at both of upper and lower portions toward a conveying direction of the solder 9a as an example, and detects the drawn-out state (deflection quantity) of the solder 9a between the drawing-out reel 11 and the brake rollers 16, when drawing the solder 9a out of the drawing-out reel 11.

When the conveying speed of the solder 9, 9a varies at the downstream side lower than the brake rollers 16, an amount of flux 3 applied to the solder 9a varies. Therefore, any irregular conveying speed makes it to be difficult to apply the flux 3 to the solder 9a with uniform thickness. For example, when the conveying speed of the solder 9a becomes faster, the flux 3 applied to the solder 9a becomes thicker. Whereas, when the conveying speed of the solder 9a becomes slower, the flux 3 applied to the solder 9a becomes thinner.

Accordingly, in order to apply the flux 3 to the solder 9a evenly, it is required that the solder 9, 9a is conveyed at a constant speed at downstream of the brake rollers 16, and the state of conveying solder at the upstream side of the brake rollers 16 does not affect the solder conveying at the downstream side of the brake rollers 16.

When deflection quantity of the solder 9a is decreased, the drawing-out buffer sensor 13 detects it by the sensor at upper side (not shown), and adjusts the deflection quantity by speeding up the rotation of the drawing-out reel 11 via a control portion 5. Whereas, when the deflection quantity is increased, the drawing-out buffer sensor 13 detects it by the sensor at lower side (not shown), and adjusts the deflection quantity by slowing down the rotation of the drawing-out reel 11 via a control portion 5. In other words, when the deflection quantity of the solder 9a exceeds or does not reach a certain range, the rotation speed of the drawing-out reel 11 varies by transmitting an alarm signal S13 to the control portion 5 by the drawing-out buffer sensor 13.

In this way, drawing-out of the solder 9a can be performed at the upstream side of the brake rollers 16, without any influences on the conveying speed of the solder 9, 9a at the downstream side of the brake rollers 16. Thereby, solder 9 can be provided, where the amount and thickness of the flux 3 to be applied are uniform.

The flux applying chamber 2 forms housing. An entrance 38 for entering the solder 9a is provided at a lower portion of an upstream side (left side) wall of the flux applying chamber 2. An exit 39 is provided at an upper portion of downstream side (right side) wall of the flux applying chamber 2. Conveying rollers 41 for conveying the solder 9 to the conveying portion 4 are also provided across the exit 39 of the flux applying chamber 2. The flux applying chamber 2 contains the flux tank 30, a heating and drying furnace 20, a thermal insulation air curtain 24, a discharging port 25, a cooler 26, a solder thermal sensor 27, an indoor thermal sensor 28 and a pulling-up roller 37 on a passing order of the solder (from a lower portion to an upper portion in the drawing). At outside of the flux applying chamber 2, a user interface such as a manipulation portion 14, a display portion 15 and the like is provided.

Liquid flux 3 including an active agent component such as organic acid and solvent (isopropyl alcohol or the like) is inserted into the flux tank 30. The flux tank 30, as the dipping member, dips the solder 9a into the flux 3 to apply the flux 3 to the surface of the solder 9a. In this embodiment, the flux tank 30 has a hexagonal section in which symmetrical oblique sides extend from two lower points of a rectangle. This sectional configuration is introduced because an amount of the flux 3 accumulated in the flux tank 30 can be limited, however, the sectional configuration is not limited thereto: it may be a rectangle or a square. The temperature of the flux 3 is maintained at a normal temperature, approximately 25 degrees C. as an example, in order for the flux 3 to be stably accumulated. Since viscosity of the flux varies when the temperature of the flux 3 varies, an amount of flux 3 applied to the surface of the solder 9a also varies, so that the flux 3 applied to the solder 9a has uneven thickness. This can be prevented by maintaining temperature of the flux 3 at a fixed temperature around 25 degrees C. Moreover, when any volatile component in the flux 3 is evaporated, specific gravity varies. This change of the specific gravity also causes the amount of flux 3 applied to the solder 9a to vary, and therefore this becomes a cause of applying the flux 3 to the solder 9a with uneven thickness. Thus, administration of specific gravity of the flux 3 may be conducted.

In this embodiment, an upper lid 32 is provided on the flux tank 30, and openings 33, 34 are formed in the upper lid 32. The opening 33 forms an inlet of the solder 9a into the flux tank 30 and the opening 34 forms an outlet of the solder 9 from the flux tank 30.

A driven conveying roller 31 is provided on a left position of the upper lid 32. The conveying roller 31 changes a running direction of the solder 9a so that the solder 9a cannot contact the upper lid 32, the flux tank 30 or the like when inserting the solder 9a into the flux tank 30.

A conveying roller 36 is provided inside the flux tank 30 so that the conveying roller 36 is driven when conveying the solder 9. Bearing members 36a are provided so as to be suspended from the upper lid 32 of the flux tank 30 and bear a shaft of the conveying roller 36. The conveying roller 36 turns the conveying direction of the solder 9 dipped into the flux tank 30 from a bottom of the flux tank 30 to a top thereof. The solder 9 turned upward by the conveying roller 36 releases the conveying roller 36 at a point of contact 36b.

The pulling-up roller 37 is provided inside the flux applying chamber 2 and bearing members 37a are suspended from a roof portion of the flux applying chamber 2. The pulling-up roller 37 is driven when conveying the solder 9. The pulling-up roller 37 is provided over the conveying roller 36 to vertically pull up the solder 9 dipped into the flux tank 30. The solder 9 released from the conveying roller 36 at the point of contact 36b is pulled up through the point of contact 37b of the pulling-up roller 37. The point of contact 37b is positioned right over the point of contact 36b.

In this embodiment, a conveying route forming means constituting a conveying route is described, where the pulling-up roller 37, together with the conveying roller 36, pull up the solder 9 which is dipped into the flux tank 30 as a dip means and to which the flux 3 is applied vertically in relation to a liquid surface of the flux 3.

The heating and drying furnace 20 is a drying means that heats and dries the solder 9 to which the flux 3 is applied. The heating and drying furnace 20 is provided above the flux tank 30 and forms vertically oriented housing. The heating and drying furnace 20 forms passages holes 20a, 20b for the solder 9 at centers of both bottom and roof portions thereof. The solder 9 to which the flux 3 is applied enters the heating and drying furnace 20 through the passage hole 20b and is heated and dried within the heating and drying furnace 20. The heated and dried solder 9 is discharged from the passage hole 20a.

The heating and drying furnace 20 maintains its heating temperature within a range from 90 degrees C. to 110 degrees C. to volatilize any solvent contained in the flux 3. Heat insulation material (not shown) is provided in the wall of the housing of the heating and drying furnace 20. This heat insulation material prevents heat from being escaped and enables the solder 9 to be efficiently heated and dried.

A heater 21 provided outside the flux applying chamber 2 is contacted with the heating and drying furnace 20 through a duct 22. The heater 21 sends hot air to the heating and drying furnace 20 through the duct 22. A windbreak wall 23 is attached at a nozzle portion of the duct 22 in order to prevent the thickness of the flux 3 from being changed by the hot air directly striking the solder 9.

The thermal insulation air curtain 24 blocks the hot air discharged from the heating and drying furnace 20 and the solvent volatilized therefrom and it prevents them from being flown upward beyond the thermal insulation air curtain 24. The thermal insulation air curtains 24 are provided at right and left positions around the passage of the solder 9 over the heating and drying furnace 20. The thermal insulation air curtain 24 sends air toward heated gas emitted from the passage hole 20a (see arrows defined by outlines shown in FIG. 1). The air pressure in this moment is approximately 380 L/min and 0.56 MPa as an example.

The cooler 26 is a cooling means that cools the heated and dried solder 9. The coolers 26 are provided at right and left positions around the passage of the solder 9 one by one over the thermal insulation air curtain 24. For the cooler 26, a cooler of heat pump type, a vortex cooler or the like is used. The cooler 26 sends air to the conveyed solder 9 (see black arrows shown in FIG. 1) and cools the heated solder 9 (for example, down to 40 degrees C.). The air pressure of the cooler 26 in this moment is approximately 250 L/min and 0.2 MPa as an example. By such a step of heating and drying the solder 9 to which the flux 3 is applied and cooling it, it is impossible to adhere or fix the flux 3 applied to the solder 9 to another member. Accordingly, it is possible to stably apply the flux to the solder 9a.

The discharging port 25 is a discharging means that discharges hot air outside the heating and drying furnace 20 as the drying means and inside of the flux applying chamber 2. The discharging port 25 includes a discharging hole formed on the flux applying chamber 2 at the position higher than the thermal insulation air curtain 24 and lower than the cooler 26, and is communicated to the flux applying chamber 2 and an outside of the flux applying chamber 2. The discharging port 25 is provided for discharging the hot air outside the heating and drying furnace 20 within housing of the flux applying chamber 2 and the volatilized solvent or the like to the outside of the flux applying chamber 2. The discharging port 25 includes a fan (not shown) and a motor for rotating the fan. By driving the motor to rotate the fan, the hot air inside the flux applying chamber 2, the volatilized solvent and the like are sucked from the flux applying chamber 2. A fire protection damper may be provided around the discharging port 25.

The solder thermal sensor 27 is a noncontact type sensor and is provided over the cooler 26 in the flux applying chamber 2. The solder thermal sensor 27 measures temperature of the surface of the cooled solder 9. For example, when the temperature of the surface of the cooled solder 9 is 40 degrees C. or more, the solder thermal sensor 27 sends an alarm signal S27 to the control portion 5.

The indoor thermal sensor 28 is provided at an upper portion of the flux applying chamber 2. The indoor thermal sensor 28 measures temperature in the flux applying chamber 2. For example, when the temperature in the flux applying chamber 2 is 60 degrees C. or more, the indoor thermal sensor 28 sends an alarm signal S28 to the control portion 5.

The conveying rollers 41 are driven rollers which are driven when the solder 9 is conveyed. The conveying rollers 41 are provided across the exit 39 of the flux applying chamber 2 so as to support their shafts by bearing members (not shown). In this embodiment, as the conveying rollers 41, a pair of upper and lower rollers is provided but this invention is not limited thereto. As the pair of upper and lower rollers, rollers 45 and 46, which will be described below, may be used.

The conveying portion 4 includes a conveying means that conveys the solder 9 on which the flux is applied. As the conveying means, the conveying portion 4 includes conveying rollers 42, 43, each of which contains upper and lower rollers, and conveying roller 44 containing a roller. In this embodiment, the conveying rollers 42, 43 and 44 are driven rollers but they may be driven by a motor. When they are driven by the motor, they may be used for the rollers for convey the solder 9 at the constant speed. In addition, the number of the conveying rollers provided in the conveying portion 4 and/or the number of roller in each conveying roller are not limited thereto.

The conveying rollers 42, 43 are driven rollers in which the upper and lower rollers nip both ends of the solder 9 and rotate conforming to the conveying speed of the solder 9.

Figure 2A:
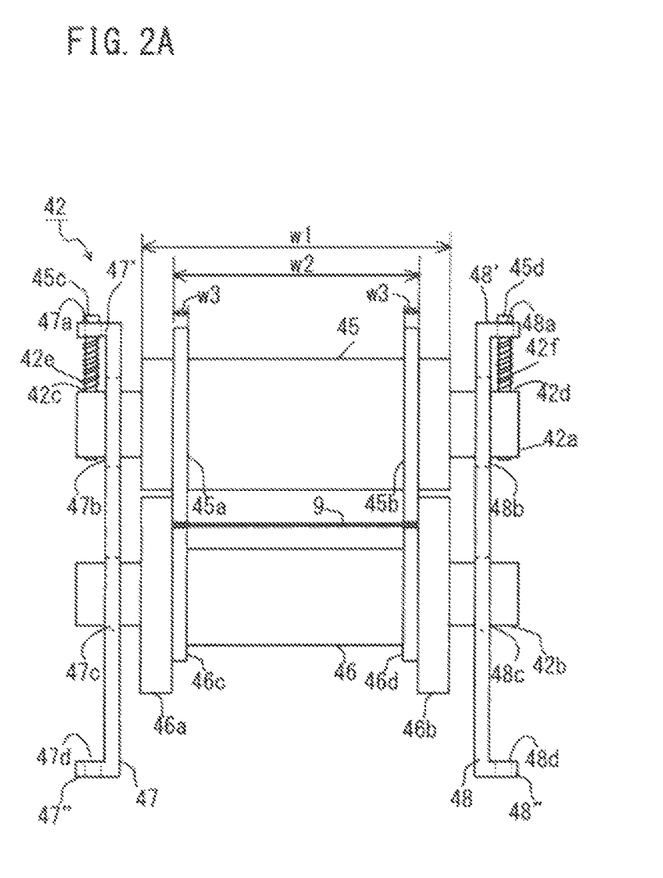
FIG. 2A is a plan view of conveying rollers 42 showing a configuration example thereof.
Figure 2B:
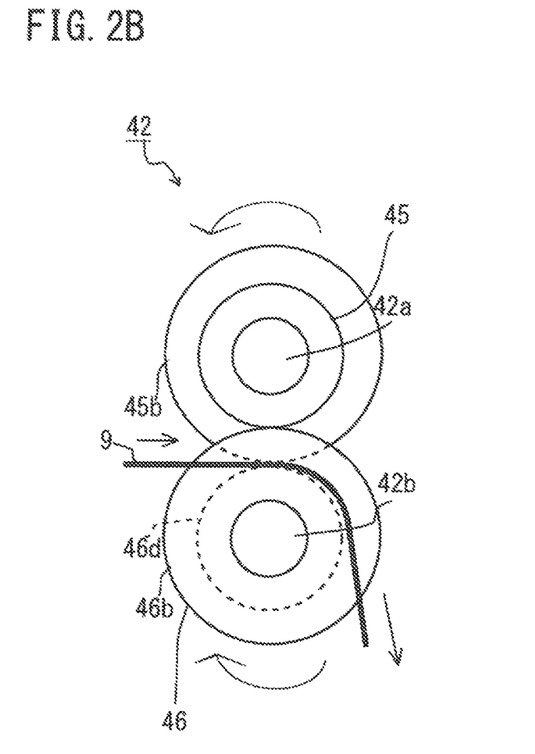
FIG. 2B is a right side view of the conveying rollers 42 showing an operation example thereof.
Figure 2C:
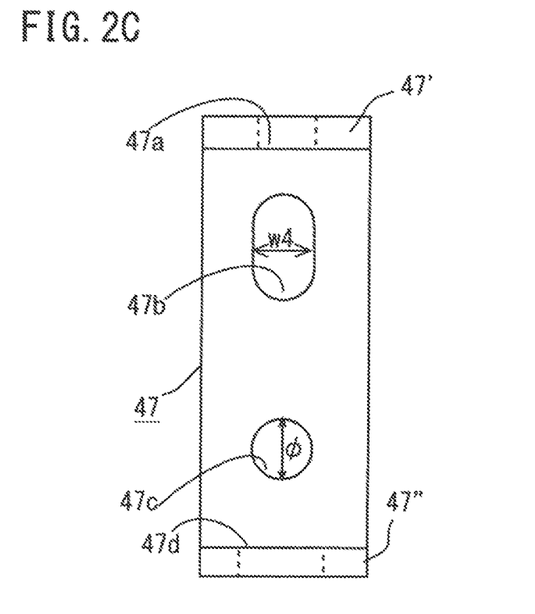
FIG. 2C is a side view of a bearing member 47 showing a configuration example thereof.

Referring to FIG. 2A through 2C, the following will describe a configuration example and an operation example of the conveying rollers 42 containing two upper and lower rollers. The conveying rollers 41 and 43 have the similar configuration to the conveying rollers 42 in this embodiment. The conveying rollers 42 shown in FIG. 2A convey the solder 9 with the upper and lower rollers 45, 46 nipping both ends of the solder 9.

The roller 45 has fringe portions 45*a*, 45*b* and a rotating shaft 42*a*. The roller 46 has large fringe portions 46*a*, 46*b* at right and left ends thereof. Small fringe portions 46*c*, 46*d*, which are smaller than the large fringe portions 46*a*, 46*b*, are provided inside the large fringe portions 46*a*, 46*b*.

Diameters of the rollers 45, 46 and the rotating shafts 42*a*, 42*b* are optional. It is desirable that whole widths w1 of the rollers 45, 46 are the same. It is desirable that w2 which extends from an end of the fringe 45*a* to an end of the fringe 45*b* is the same as a width which extends from an end of the small fringe 46*c* to an end of the small fringe 46*d*. It is desirable that w3 which is a width of each of the fringes 45*a*, 45*b* is the same as a width of each of the small fringes 46*c*, 46*d*. Accordingly, the fringe 45*a* and the small fringe 46*c* are contacted to each other, and the fringe 45*b* and the small fringe 46*d* are contacted to each other. Thus, the solder 9 is conveyed with the fringe 45*a* and the small fringe 46*c* nipping an end of the solder 9 as well as the fringe 45*b* and the small fringe 46*d* nipping the other end of the solder 9.

The roller shaft bearing member 47 of the conveying rollers 42 has a configuration in which supporting projection portions 47', 47" are projected from at upper and lower ends of a rectangular plate. The supporting projection portion 47' has a hole 47*a*. The roller shaft bearing member 47 has two openings 47*b*, 47*c* at two upper and lower portions of the rectangular plate. The rotating shafts 42*a*, 42*b* of the rollers 45, 46 are respectively passed through the openings 47*b*, 47*c*. The opening 47*b* shown in FIG. 2C is formed as a vertically oriented oval. A width w4 of the opening 47*b* is slightly larger than the diameter of the rotating shaft 42*a*. A vertical length of the opening 47*b* may be configured to be an optional length so that the roller 45 can be moved away from the roller 46. A threaded hole 47*d* for attaching the roller shaft bearing member 47 to a table or the like is formed at the bottom of the roller shaft bearing member 47. A diameter Φ of the opening 47*c* is slightly larger than a diameter of the rotating shaft 42*b* of the roller 46.

The roller shaft bearing member 48 has the same configuration as the roller shaft bearing member 47 but they are arranged so as to be inverted to right and left, and it also has supporting projection portions 48', 48" at upper and lower ends of a rectangular plate. The supporting projection portion 48' has a hole 48*a*. The roller shaft bearing member 48 has two openings 48*b*, 48*c* at two upper and lower portions of the rectangular plate. The rotating shafts 42*a*, 42*b* of the rollers 45, 46 are respectively passed through the openings 48*b*, 48*c*. A threaded hole 48*d* for attaching the roller shaft bearing member 48 to the table or the like is formed at the bottom of the roller shaft bearing member 48.

Both ends of the rotating shaft 42*a* of the roller 45 have threaded holes 42*c*, 42*d* at a radial direction. A screw 45*c* is screwed into the threaded hole 42*c* of the rotating shaft 42*a* through the hole 47*a* of the roller shaft bearing member 47. The screw 45*c* is inserted into a spring 42*e* between the supporting projection portion 47' and the rotating shaft 42*a*. A screw 45*d* is screwed into the threaded hole 42*d* of the rotating shaft 42*a* through the hole 48*a* of the roller shaft bearing member 48. The screw 45*d* is inserted into a spring 42*f* between the supporting projection portion 48' and the rotating shaft 42*a*. Thus, the roller 45 is suspended by the screws 45*c*, 45*d* and the springs 42*e*, 42*f*.

As shown in FIG. 2B, when the solder 9 is conveyed between the rollers 45, 46, the fringe 45*b* of the roller 45 and the small fringe 46*d* of the roller 46 nip an end of the solder 9 along the width direction thereof. When the solder 9 is conveyed from left to right (a direction of a black arrow shown in FIG. 2B) and it is conveyed around a circumference of the roller 46 and conveyed downward, the roller 45 rotates counterclockwise and the roller 46 rotates clockwise, in harmony with the conveyance of the solder 9, as shown by arrows shown in FIG. 2B.

As shown in FIG. 2A, when the solder 9 is conveyed between the rollers 45, 46, the roller 45 is lifted by only the thickness of the solder 9. The springs 42*e*, 42*f* apply downward elastic force to the roller 45 by lifting the roller 45. Accordingly, it is possible to convey the solder 9 with the conveyed solder 9 being elastically nipped. Further, an area of the solder 9 which a roller contacts while the solder 9 is conveyed is decreased as compared with a case where the solder 9 is conveyed using a cylindrical roller, thereby preventing the solder 9 from being extended or deformed. Thus, it is possible to convey the solder 9 with maintaining its quality.

Figure 3A:
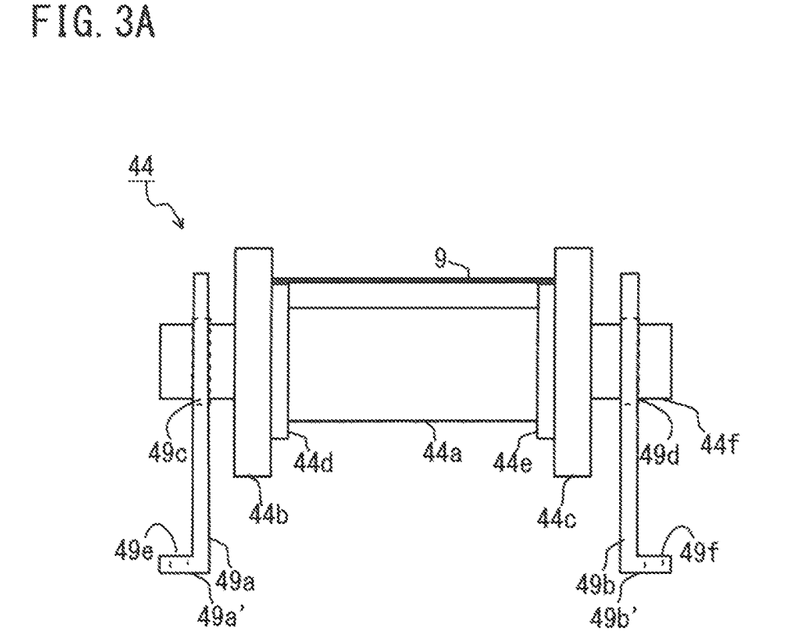
FIG. 3A is a plan view of a conveying roller 44 showing a configuration example thereof.

The conveying roller 44 shown in FIG. 1 is a driven roller following the conveyance of the solder 9. As shown in FIG. 3A, the conveying roller 44 has the same configuration as that of the roller 46. The conveying roller 44 has a cylindrical roller main body 44*a*, large fringes 44*b*, 44*c*, small fringes 44*d*, 44*e* inside each large fringe, and a rotating shaft 44*f*. The rotating shaft 44*f* of the conveying roller 44 is inserted to holes 49*c*, 49*d* of roller shaft bearing members 49*a*, 49*b*. Each of the roller shaft bearing members 49*a*, 49*b* has a configuration in which supporting projection portion 49*a*', 49*b*' is projected from at a bottom end of a rectangular plate. A threaded hole 49*e*, 49*f* is formed in the supporting projection portion 49a', 49b' to attach the roller shaft bearing member 49a, 49b to a table or the like.

The conveying roller 44 conveys the solder 9 with both ends of the solder 9 along the width direction thereof being put on the small fringes 44d, 44e, therefore an area of the solder 9 which a roller contacts while the solder 9 is conveyed becomes decreased. Thus, it is possible to convey the solder 9 with maintaining its quality.

Figure 3B:
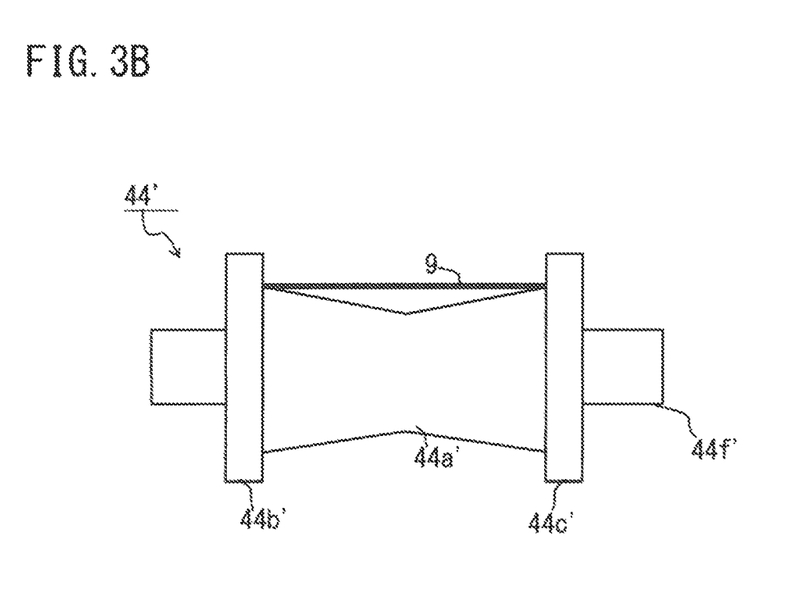
FIG. 3B is a plan view of a conveying roller 44' as a variation of said conveying roller 44 showing a configuration example thereof.

A conveying roller 44' shown in FIG. 3B as a variation of the conveying roller 44 has a roller main body 44a', fringes 44b', 44c', and a rotating shaft 44f. A bearing member, not shown, bears and supports the conveying roller 44. The roller main body 44a' has a shape like a sandglass. Namely, a diameter thereof becomes gradually smaller from its opposite ends to its middle portion and the diameter of the middle portion is the smallest.

The conveying roller 44' conveys the solder 9 with both ends of the solder 9 along the width direction thereof being put on the conveying roller 44'. Thereby, an area of the solder 9 which the roller main body 44a' contacts becomes decreased. Thus, it is possible to convey the solder 9 with maintaining its quality. Further, the shape of the roller main body 44a' is devised to be so that the area thereof that contacts the solder 9 becomes smaller, which is different from the conveying roller 44 configured to convey the solder 9 on the small fringe 44d, 44e shown in FIG. 3A. Thereby, the solder 9 having any width that is narrower than the whole length of the roller main body 44a' can be conveyed, regardless of the width of the small fringe 44d, 44e. Such a configuration of the conveying roller 44, 44' may be applied to any of the conveying rollers 31, 36, a speed detection roller 64, or the pulling-up roller 37.

The winding portion 6 shown in FIG. 1 includes a winding roller 66 of the solder 9, an interlayer paper sheet supplying roller 65, a laser sensor 63 that measures a winding speed at the upstream side of the winding roller 66, and a speed detection roller 64 arranged beneath the laser sensor 63.

The winding roller 66 is a winding means that winds the solder 9, which is provided at the downstream side of the flux tank 30 as a dip coating means and the rotation speed of which is controlled by the control portion 5. In this embodiment, the winding roller 66 constitutes a constant speed conveying means that conveys the solder 9 dipped into the flux tank 30 and pulled up vertically with being under load by the brake rollers 16, at a predetermined speed by the control portion 5. In addition, the constant speed conveying means may be provided apart from the winding roller 66.

The winding roller 66 rotates so that the solder 9 is conveyed at the conveying speed v, and winds the solder 9. The solder 9 wound by the winding roller 66 is pulled up from the flux tank 30, with the predetermined tension applied by the brake rollers 16 at the upstream side of the flux tank 30. This realizes the stable conveying speed v of the solder 9. The winding roller 66 includes a motor (not shown) which rotates at the predetermined speed by being controlled by the control portion 5.

The interlayer paper sheet supplying roller 65 rotates following the conveyance of the solder 9. When the winding roller 66 winds the solder 9, an interlayer paper sheet 67 is supplied at a position between the solders 9 so that the wound solders 9 are not contacted to each other. For the interlayer paper sheet 67, a long paper sheet having the same width as that of the solder 9 is used.

The laser sensor 63 is a conveying speed measurement means that measures a conveying speed v of the solder 9, and the laser sensor 63 is a noncontact type sensor that sends a pulse signal based on a measurement result thereof to the control portion 5. The speed detection roller 64 is provided beneath the laser sensor 63 and rotates following the conveyance of the solder 9. The speed detection roller 64 has a reflection body 64a for reflecting laser light from the laser sensor 63 on a circumferential point thereof.

The reflection body 64a reflects the laser light emitted from the laser sensor 63 together with the rotation of the speed detection roller 64. The laser sensor 63 receives the reflected laser light and sends the pulse signal to the control portion 5. The control portion 5 calculates the number of revolution per minute of the speed detection roller 64 from a frequency of the received pulse signal. The control portion 5 also calculates the conveying speed v' of the solder 9 from the calculated number of revolution per minute of the speed detection roller 64. The control portion 5 controls a rotation speed of the winding roller 66 based on this information so that the solder 9 is conveyed at a constant conveying speed. By pulling the solder 9 up vertically at the constant conveying speed, the flux remains on a surface of the solder 9a and a back surface thereof with uniform thickness according to the conveying speed v of the solder 9 because interfacial tension acts on the solder 9a and the flux 3.

The brake rollers 16 are arranged at the upstream side of the flux tank 30 and is a load applying means that applies a predetermined load to the solder along the conveying direction of the solder, together with the winding roller 66 as the winding means. Compared to the normal rollers, crimp force at the nip portion of the upper and lower rollers is set higher. The brake rollers 16 are provided between the drawing-out reel 11 and the flux tank 30. This is because the solder 9 to which the flux 3 is applied is pulled up vertically at the constant conveying speed v, by applying tension to the solder 9, 9a, where the brake rollers 16 act together with the winding roller 66. The solder 9 pulled up vertically at the conveying speed v is coated by the flux 3 with the uniform thickness.

It is preferable that the brake rollers 16 are arranged outside the flux applying chamber 2 in order to avoid any influence of variation in temperature or humidity inside the flux applying chamber 2. However, the brake rollers 16 may be arranged inside the flux applying chamber 2. For the brake rollers 16, a roller member such as metallic rollers, rubber rollers with heat resistance, carbon rollers and resin rollers can be utilized.

[Control of Conveying Speed of Solder 9]

Figure 4:
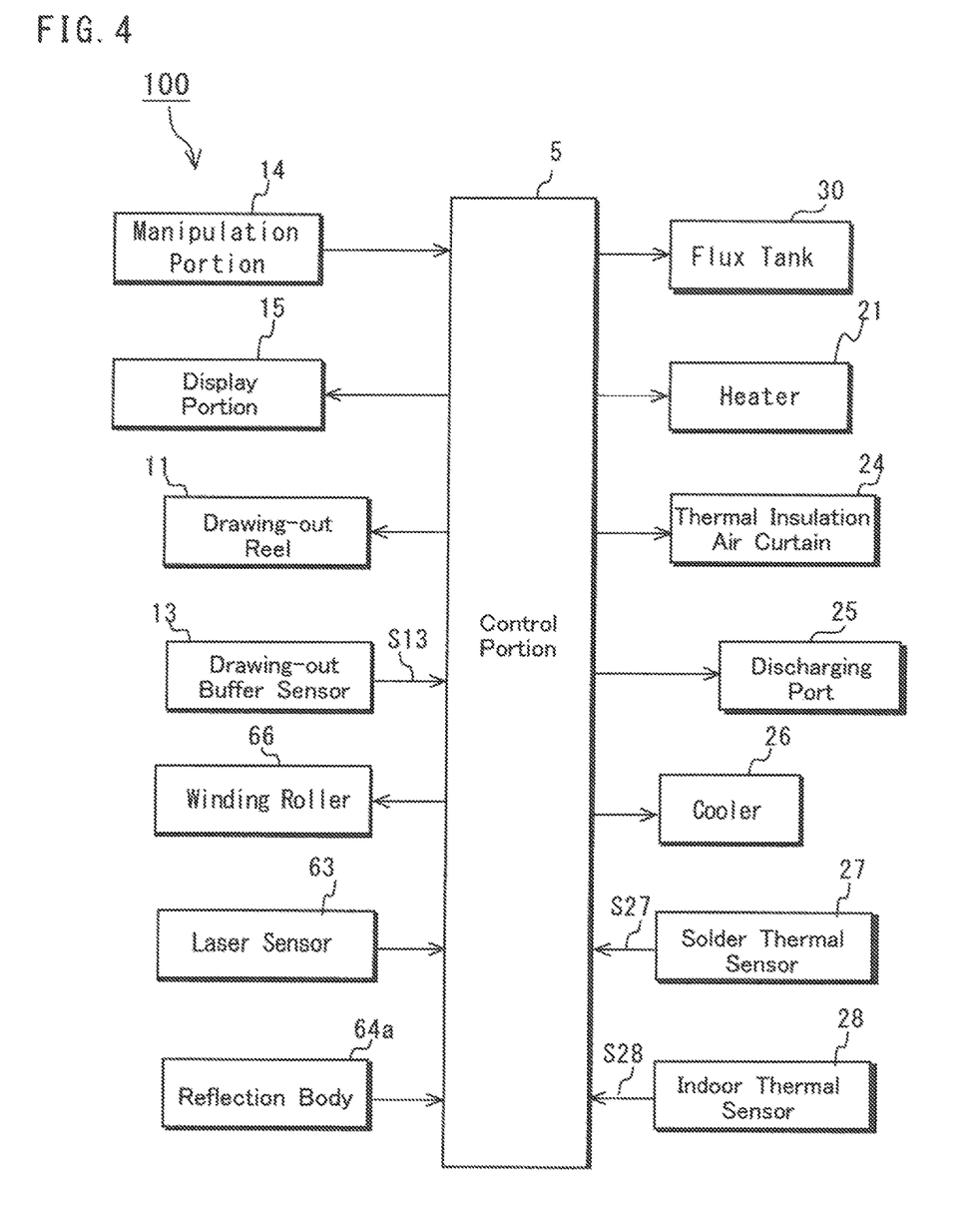
FIG. 4 is a block diagram showing a configuration example of a control system of the flux applying device 100.

Subsequently, the following will describe a configuration of a control system of the flux applying device 100 with reference to FIG. 4. The control portion 5 is connected with the manipulation portion 14, the display portion 15, the drawing-out reel 11, the drawing-out buffer sensor 13, the winding roller 66, the laser sensor 63, the speed detection roller 64 and the like, in order to control the conveying speed of the solder 9.

The control portion 5 contains, for example, a read only memory (ROM), a random access memory (RAM), a central processing unit (CPU) and storage member, in order to control the whole system. For example, ROM stores a system program for controlling the whole flux applying device 100.

The manipulation portion 14 includes an input portion such as numeric keys, a touch panel and the like, which are not shown. The manipulation portion 14 allows setting a control condition of the thickness of the flux 3 or the like in the flux applying device 100. The control condition of the thickness of the flux 3 includes composition, size, temperature and the like of the solder 9a and flux 3.

The control portion 5 controls the vertical lift of the solder 9 and the conveying speed v of the solder 9 corresponding to composition of the flux 3. This enables an oversupply of the flux 3 to be constantly removed from the solder 9 so that thickness of the flux 3 on the solder 9 is controlled. The control steps on this will be described hereinafter.

A user inputs a thickness control condition and the like through the manipulation portion 14. The control portion 5 produces conveying speed control data about the conveying speed v of the solder 9 based on the input thickness control condition.

The control portion 5 controls input/output of the drawing-out reel 11, the drawing-out buffer sensor 13, the winding roller 66, the laser sensor 63, the speed detection roller 64 and the like, based on the conveying speed control data. The following will describe control steps of the conveying speed v based on the conveying speed control data.

The control portion 5 rotates the drawing-out reel 11 so that the solder 9a is drawn-out at a predetermined speed. When the drawn-out state (deflection quantity) of the solder 9a exceeds or does not reach a predetermined range, the drawing-out buffer sensor 13 sends the alarm signal S13 to the control portion 5. The control portion 5 adjusts the rotation speed of the drawing-out reel 11 based on the alarm signal S13.

The control portion 5 rotates a drive motor (not shown) installed inside the winding roller 66. Thereby, the winding roller 66 and the brake rollers 16 collaborate to rotate, while applying a predetermined tension to the solder 9. By applying any predetermined tension to the solder 9, the solder 9 dipped to the flux tank 30 is pulled up from the flux tank 30 with keeping the conveying speed v (v=700 mm/min). The conveying speed v of the solder 9 is kept constant from the brake rollers 16 to the winding roller 66 through the flux tank 30.

The control portion 5 calculates the number of revolution per minute of the speed detection roller 64 based on the pulse signal from the laser sensor 63 and the speed detection roller 64, and then calculates an actual conveying speed v' of the solder 9 based on the number of revolution. The control portion 5 adjusts the rotation speed of the winding roller 66 so that the calculated conveying speed v' of the solder 9 is brought to the conveying speed v (v=700 mm/min). Accordingly, a thin uniform film of the flux 3 having a one-side of 10 μm can be coated on the solder 9a, for example.

The control portion 5 also performs a temperature control. The control portion 5 controls a temperature control device (not shown) equipped with the flux tank 30 to drive so that the temperature of the flux 3 contained in the flux tank is kept at a fixed temperature (for example, 25 degrees C.).

The control portion 5 controls the heater 21 connected to the heating and drying furnace 20 to drive the heater 21. The heater 21 heats/dries so that the temperature in the heating and drying furnace 20 stays within a range of 90 through 110 degrees C.

The control portion 5 controls the thermal insulation air curtain 24 to blow air toward heated gas emitted from the passage hole 20a, so that hot air and volatilized solvent from the heating and drying furnace 20 cannot be spread into the flux applying chamber 2.

The control portion 5 controls a fan (not shown) equipped with the discharging port 25 to discharge the hot air, which is flown out of the heating and drying furnace 20 to the flux applying chamber 2, from the flux applying chamber 2 to the outside through the discharging port 25.

The control portion 5 controls a fan (not shown) of the discharging port 25 to drive the fan, and thereby rotates a motor connected with the fan of the discharging port 25. When the motor rotates and the fan rotates, the hot air inside the flux applying chamber 2 is blown into the discharging port 25.

The control portion 5 controls the cooler 26 to blow cooled air to the heated and dried solder 9 and cool it. In this moment, it is preferable that the cooler 26 cools the solder 9 below 40 degrees C.

The control portion 5 is connected to the solder thermal sensor 27. The solder thermal sensor 27 measures temperature of the solder 9 all the time. When the temperature of the solder 9 exceeds the fixed temperature (for example, 40 degrees C.), the solder thermal sensor 27 sends the alarm signal S27 to the control portion 5. When the control portion 5 receives the alarm signal S27, the control portion 5 stops rotations of the drawing-out reel 11, the winding roller 66 and the like until the temperature of the solder 9 drops to the fixed temperature or less.

The control portion 5 is connected to the indoor thermal sensor 28 of the flux applying chamber 2. The indoor thermal sensor 28 measures temperature inside the flux applying chamber 2 all the time. When the temperature inside the flux applying chamber 2 exceeds the fixed temperature (for example, 60 degrees C.), the indoor thermal sensor 28 sends the alarm signal S28 to the control portion 5. When the control portion 5 receives the alarm signal S28, the control portion 5 stops the heater 21 and the conveyance of the solder 9 until the temperature inside the flux applying chamber 2 drops to the fixed temperature or less. The control portion 5 also prevents a door (not shown) of the flux applying chamber 2 from opening until the temperature inside the flux applying chamber 2 drops to the fixed temperature or less.

The order of the control steps is not limited to the above-mentioned one, and the control portion 5 can simultaneously perform a plurality of control steps. Additionally, any storage device may be provided inside or outside the control portion 5 to store thickness control condition, control data and the like.

By using a thickness gauge 40 of noncontact type, which is shown in FIG. 1, to detect an amount (film thickness amount) of applied flux 3 on the solder 9 in real time, a thickness control can be performed by a feedback control based on the detection of the amount of applied flux 3. According to such a feedback control, when the thickness of the flux 3 to the solder 9 is thicker, the conveying speed v of the solder 9 is set to be slower so that the flux 3 to be applied to the solder 9 is decreased. On the contrary, when the thickness of the flux 3 to the solder 9 is thinner, the conveying speed v of the solder 9 is set to be faster so that the flux 3 to be applied to the solder 9 is increased.

[Configuration Example of Solder 9]

Figure 5A:
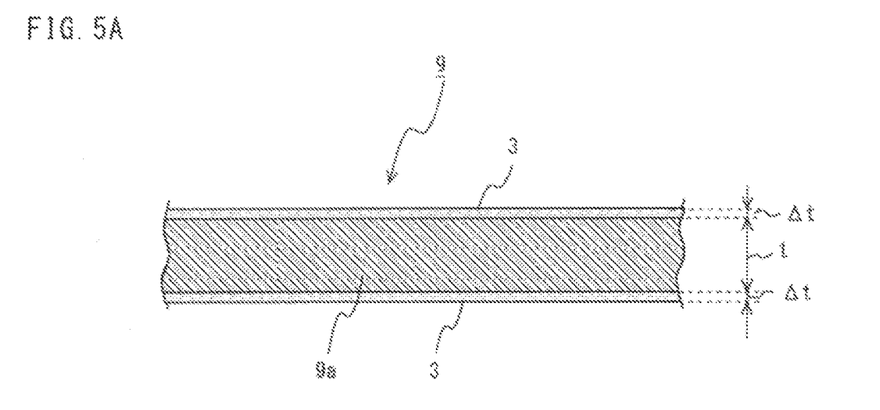
FIG. 5A is a sectional view of solder 9 showing a configuration example thereof.
Figure 5B:
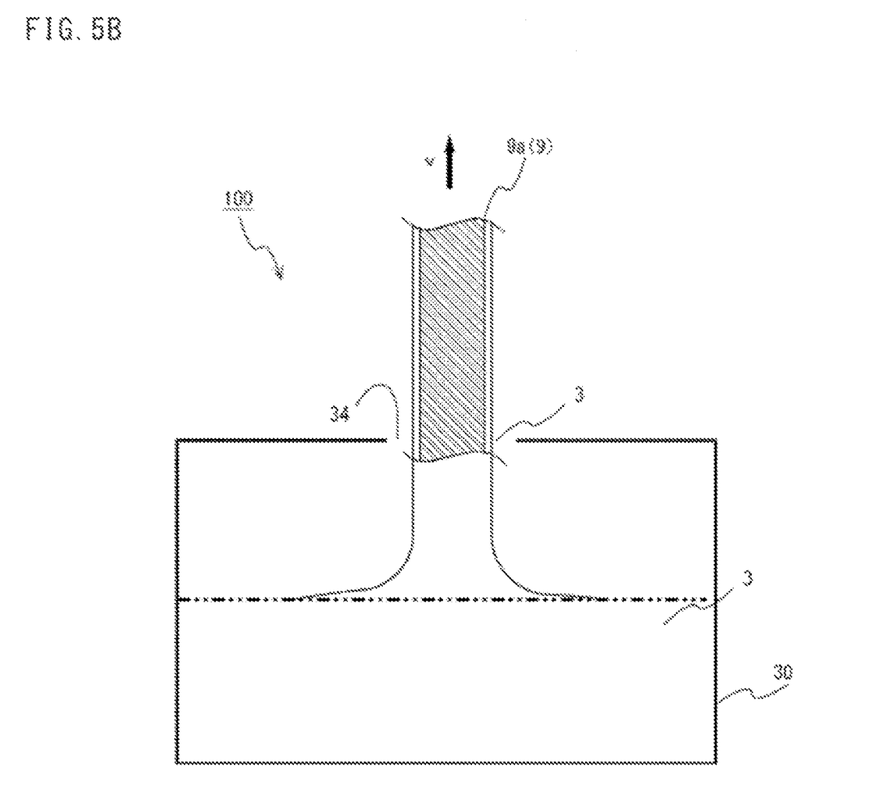
FIG. 5B is a process diagram showing a forming example of the solder 9.

The following will describe a configuration example of the solder 9 to which the flux is applied with reference to FIGS. 5A and 5B. The solder 9 shown in FIG. 5A is formed by the solder 9a to which no flux is applied and the flux 3 coating the surface and back surface of the solder 9a. The solder 9a has a predetermined width t (t=approximately 15 mm through 40 mm) and a predetermined thickness, not shown, (approximately 0.25 mm), and the flux 3 has thickness Δt.

The solder 9 shown in FIG. 5B indicates a case where the thickness of the flux 3 is controlled in the flux applying device 100. The flux 3 having predetermined temperature (for example, 25 degrees C.) is put into the flux tank 30. The solder 9a is conveyed at a predetermined speed and dipped into the flux tank 30. The solder 9a dipped into the flux tank 30 is pulled up from the flux tank 30 at the conveying speed v vertically (to a direction of a black arrow shown in FIG. 5B) in relation to a liquid surface of the flux 3, which is shown by two-dot chain in FIG. 5B. By pulling up the solder 9a from the flux tank 30 at the constant conveying speed v vertically, the interfacial tension acts on the solder 9a and the flux 3, so that the flux 3 having a uniform thickness according to the conveying speed v remains on the surface and back surface of the solder 9a. The solder 9 vertically pulled up is passed through the heating and drying step and the cooling step. The temperature of the solder 9 and the thickness of the flux 3 are then measured. The solder 9 is conveyed and wound. In the flux applying device 100, the conveying speed v of the solder 9, 9a can be controlled, thereby it is possible to manufacture the solder 9 to which the flux 3 having uniform thickness is applied.

The flux applying device 100 according to the embodiment applies the flux 3 having uniform thickness to the surfaces of the solder 9a pulled up from the flux tank 30. The flux applying device 100 includes the flux tank 30, the brake rollers 16, the pulling-up roller 37, the heating and drying furnace 20, the thermal insulation air curtains 24, the cooler 26, the conveying rollers 31, 36, 37, 41, 42-44, the laser sensor 63, the speed detection roller 64, and the winding roller 66.

Based on such a configuration, since it is possible to convey the solder 9, 9a at a fixed conveying speed v, the thickness of the flux 3 applying to the solder 9a can be controlled so as to be made constant and 10 μm or less. Accordingly, it is possible to realize the application of the flux having an extremely thin thickness as compared to conventional examples. Since any special member for removing the surplus of the flux 3 is not required in this invention, production costs therefor can be also saved and its maintenance is made easier.

Further, the solder 9 according to the embodiment is vertically pulled up from the flux tank 30 containing the flux 3 and is conveyed at a fixed conveying speed v.

Accordingly, the thickness of the flux 3 applied to the solder 9 is made constant. It is possible to apply the flux 3 having thin thickness to the solder 9, which is excellent in stability and evenness of the coat surface, in comparison with a conventional system.

Although a case where one strip of the solder 9 is manufactured has been described in the flux applying device 100 according to the above embodiments, a case where two or more strips of the solder 9 are manufactured at the same time may be as a configuration of the invention. In that case, mass production of the solder 9 at once can be realized, and therefore the running costs can be saved.

Further, in order to convey the solder 9 with being some load applied by the brake rollers 16 at a predetermined conveying speed under the control of the control portion 5, the pulling-up roller 37 and the conveying rollers 31, 36 and 41-44 may not be the driven roller, but may have a motor (not shown) connected to the control portion 5, and the motor can be controlled to rotate at a fixed speed according to the desired conveying speed v as the constant speed conveying means. The flux tank 30 may be connected to a flux controller for controlling a liquid volume of stored flux 3 or a reservoir tank for reserving the flux 3, in order to make the component and amount of the flux stored in the flux tank 30 constant.

INDUSTRIAL APPLICABILITY

The present invention is applicable to and extremely suitable for a flux applying device for applying flux to the solder with uniform thickness, and the solder formed by the flux applying device.

DESCRIPTION OF CODES

1 Solder Supplying Portion
2 Flux Applying Chamber
4 Conveying Portion
5 Control Portion
6 Winding Portion
11 Drawing-out reel
13 Drawing-out Buffer Sensor
14 Manipulation Portion
15 Display Portion
16 Brake Rollers
20 Heating and Drying Furnace
21 Heater
24 Thermal Insulation Air Curtain
25 Discharging Port
26 Cooler
27 Solder Thermal Sensor
28 Indoor Thermal Sensor
30 Flux Tank
63 Laser Sensor
64 Speed Detection Roller
66 Winding Roller
100 Flux Applying Device

The invention claimed is:

1. A flux applying device for applying flux to a surface of solder, the flux applying device comprising:
a flux tank where the flux is applied to the surface of the solder by dipping the solder into the flux;
a load applying member being provided at a upstream side of the flux tank, when a side into which the solder enters is set to be the upstream side and a side out of which the solder is discharged is set to be a downstream side;
a constant speed conveyor system that conveys the solder at a predetermined speed, the constant speed conveyor system being provided at a downstream side of the flux tank, the solder to which the flux is applied by the flux tank being pulled up vertically in relation to a liquid surface of the flux, wherein the constant speed conveyor system includes a winder, and further an interlayer paper sheet supplying roller that supplies an interlayer paper sheet when winding the solder by the winder;
a dryer that dries the solder to which the flux is applied, the dryer being provided at the downstream side of the flux tank;
a cooler that cools the dried solder;
a conveying speed measurement sensor that measures a conveying speed of the solder; and
a control system that controls the conveying speed of the solder,
wherein the load applying member acts together with the constant speed conveyor system to apply tension to the solder.

2. The flux applying device according to claim 1, wherein the constant speed conveyor system further includes at least one conveying roller, the conveying roller contains two rollers that nip the solder, and the rollers nip both ends of the solder.

3. The flux applying device according to claim 1, wherein at least the flux tank, dryer, and cooler are housed in a flux applying chamber, and the flux applying chamber further includes a discharging means discharge port that communicates with outside of the flux applying chamber and discharges hot air inside the flux applying chamber.

4. The flux applying device according to claim 2, wherein at least the flux tank, dryer, and cooler are housed in a flux applying chamber, and the flux applying chamber further includes a discharge port that communicates with outside of the flux applying chamber and discharges hot air inside the flux applying chamber.

* * * * *

UNITED STATES PATENT AND TRADEMARK OFFICE
CERTIFICATE OF CORRECTION

PATENT NO. : 10,391,589 B2
APPLICATION NO. : 15/563017
DATED : August 27, 2019
INVENTOR(S) : Manabu Muraoka et al.

Page 1 of 1

It is certified that error appears in the above-identified patent and that said Letters Patent is hereby corrected as shown below:

In the Claims

Column 15, Line 4, Claim 3, after "a" delete "discharging means"

Signed and Sealed this
Twelfth Day of November, 2019

Andrei Iancu
*Director of the United States Patent and Trademark Office*